United States Patent
Lai

(10) Patent No.: US 9,950,640 B2
(45) Date of Patent: *Apr. 24, 2018

(54) ADAPTIVE EV PEDAL STROKE

(71) Applicant: THUNDER POWER NEW ENERGY VEHICLE DEVELOPMENT COMPANY LIMITED, Central (HK)

(72) Inventor: Sheng-Fu Lai, Taoyuan (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,892

(22) Filed: Aug. 10, 2016

(65) Prior Publication Data

US 2017/0113571 A1    Apr. 27, 2017

Related U.S. Application Data

(63) Continuation of application No. 14/967,392, filed on Dec. 14, 2015, now Pat. No. 9,463,801, which is a
(Continued)

(51) Int. Cl.
*B60L 15/20*     (2006.01)
*B60L 11/02*     (2006.01)
(Continued)

(52) U.S. Cl.
CPC ............. *B60L 15/20* (2013.01); *B60L 11/02* (2013.01); *B60L 11/1803* (2013.01);
(Continued)

(58) Field of Classification Search
CPC ...... B60L 15/20; B60L 11/02; B60L 11/1803; B60L 2240/16; B60L 2240/423;
(Continued)

(56) References Cited

U.S. PATENT DOCUMENTS 6,055,466 A    4/2000  Grewe
9,463,801 B1  10/2016  Lai
(Continued)

FOREIGN PATENT DOCUMENTS

DE    102 05 039 A1    8/2003
DE    600 38 387 T2    4/2009
(Continued)

OTHER PUBLICATIONS

European Search Report for EP 16195422.7 dated Mar. 6, 2017, 9 pages.
(Continued)

*Primary Examiner* — Aaron L Troost
(74) *Attorney, Agent, or Firm* — Kilpatrick Townsend & Stockton LLP

(57) ABSTRACT

This application discusses various ways to adjust the performance of a variable input control in accordance with previous use data. In some embodiments, the previous use data can be associated with particular users of the variable input control. In this way, a response provided by the user input control can be adjusted to accommodate particular patterns of use on a user by user basis. In some embodiments, the variable input control can take the form of an accelerator pedal of a vehicle. Performance of the accelerator pedal can be adjusted by changing an amount of engine power provided for a particular accelerator pedal position. The adjustment can arrange commonly utilized power settings in the middle of the accelerator pedal range of motion to make manipulation of the accelerator pedal more comfortable and convenient for each user of the accelerator pedal.

20 Claims, 8 Drawing Sheets

Related U.S. Application Data continuation of application No. 14/923,436, filed on Oct. 27, 2015.

(51) Int. Cl.
*B60L 11/18* (2006.01)
*B60W 30/188* (2012.01)

(52) U.S. Cl.
CPC ........ *B60W 30/188* (2013.01); *B60L 2240/16* (2013.01); *B60L 2240/423* (2013.01); *B60L 2240/62* (2013.01); *B60L 2240/64* (2013.01); *B60L 2250/20* (2013.01); *B60L 2250/26* (2013.01); *B60L 2260/42* (2013.01); *B60W 2540/10* (2013.01); *Y02T 10/645* (2013.01); *Y02T 10/7005* (2013.01); *Y02T 10/7275* (2013.01); *Y02T 10/7291* (2013.01); *Y02T 90/16* (2013.01); *Y02T 90/162* (2013.01)

(58) Field of Classification Search
CPC ............ B60L 2240/62; B60L 2240/64; B60L 2250/20; B60L 2250/26; B60L 2260/42; B60W 30/188; B60W 2540/10; Y02T 10/645; Y02T 10/7005; Y02T 10/7275; Y02T 10/7291; Y02T 90/16; Y02T 90/162
See application file for complete search history.

(56) References Cited

U.S. PATENT DOCUMENTS

| | | | |
|---|---|---|---|
| 2009/0112439 A1* | 4/2009 | Kuang | ................ B60W 30/188 701/99 |
| 2010/0308986 A1 | 12/2010 | Dobryden et al. | |
| 2013/0275023 A1* | 10/2013 | Gregg | ..................... F02D 28/00 701/102 |
| 2014/0358393 A1 | 12/2014 | Darnell et al. | |
| 2015/0045988 A1* | 2/2015 | Gusikhin | .............. B60R 16/037 701/2 |
| 2015/0233304 A1 | 8/2015 | Hara et al. | |
| 2017/0113570 A1 | 4/2017 | Lai | |
| 2017/0113701 A1 | 4/2017 | Lai | |

FOREIGN PATENT DOCUMENTS

| | | |
|---|---|---|
| DE | 10 2012 209518 A1 | 12/2012 |
| DE | 10 2013 010542 A1 | 6/2015 |
| EP | 2 891 589 A2 | 7/2015 |
| FR | 2 757 900 A1 | 7/1998 |

OTHER PUBLICATIONS

U.S. Appl. No. 15/217,512, filed Jul. 22, 2016 Non-Final Rejection dated Sep. 1, 2017, all pages.
Notice of Allowance dated Jun. 10, 2016, for U.S. Appl. No. 14/967,392, 13 pages.

\* cited by examiner

ADAPTIVE EV PEDAL STROKE

RELATED APPLICATION

The present Continuation application claims the benefit of U.S. Non-Provisional application Ser. No. 14/967,392 filed Dec. 14, 2105, and U.S. Non-Provisional U.S. application Ser. No. 14/923,436, filed Oct. 27, 2015, the disclosure of which are hereby incorporated by reference in their entirety for all purposes.

FIELD

The disclosed embodiments relate generally to ways of customizing a vehicle control configuration on a user by user basis. In particular, apparatus and methods related to customizing an output provided in response to a user input at an accelerator pedal to suit a user's driving habits are disclosed.

BACKGROUND

Input controls have typically been designed to suit the needs of any number of users. Unfortunately, what can be a convenient and easy control configuration for one user can be inefficient for another user. Control pedals of a vehicle are one example of a type of control that can undergo substantial use variation on a person by person basis. For example, some users may be more prone to stopping and starting a vehicle rapidly. Users with these types of driving habits would find it more convenient and intuitive for a smaller amount of pedal displacement to yield a greater amount of engine or brake response, while a user who preferred more gradual acceleration and braking might prefer the control associated with a more gradual onset of power in response to a given amount of pedal displacement. For these reasons, more customizable controls are desirable.

SUMMARY

This paper describes various embodiments that relate to a control system configured to adjust the output of a variable input control.

An electric vehicle is disclosed which includes the following: a battery; an electric motor; a vehicle control unit configured to control a flow of current from the battery to the electric motor; a variable input control in electrical communication with the vehicle control unit and configured to receive user inputs that transition the variable input control between multiple control positions, each one of the control positions corresponding to a different amount of power being supplied to the electric motor by the battery; and a memory storage device configured to record the amount of power supplied to the electric motor. The vehicle control unit periodically instructs the voltage control unit to adjust the amount of power delivered from the battery to the electric motor for one or more of the control positions so that a control position located within a central range of the variable input control corresponds to an average amount of power recorded by the memory storage device.

A method for adjusting a response provided by a variable input control configured to govern an amount of energy supplied to a vehicle motor of a vehicle is disclosed. The method includes the following operations: receiving a user input at the variable input control; recording the amount of power supplied to the vehicle motor in response to the user input to a memory storage device; and adjusting the amount of energy supplied for a given user input at the variable input device in accordance with the recorded amount of power and previous amounts of power recorded by the memory storage device so that an average amount of power supplied to the vehicle motor is biased towards a central range of the variable input control A control system suitable for controlling power delivered from a battery to a motor of a vehicle is disclosed. The control system includes the following: a user input control configured to send a first signal when a user moves the user input control to a first control position and a second signal when the user moves the user input control to a second control position; a memory storage device configured to record an amount of power delivered to the motor during operation of the vehicle; and a vehicle control unit configured to receive the signals from the user input control and transmit a power signal to the motor. The vehicle control unit is configured to direct an adjustment of the amount of power supplied in response to the first signal by a first amount and to adjust the amount of power supplied in response to the second signal by a second amount different than the first amount. The adjustments are made in accordance with the recorded amounts of power delivered to the motor over a period of time.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
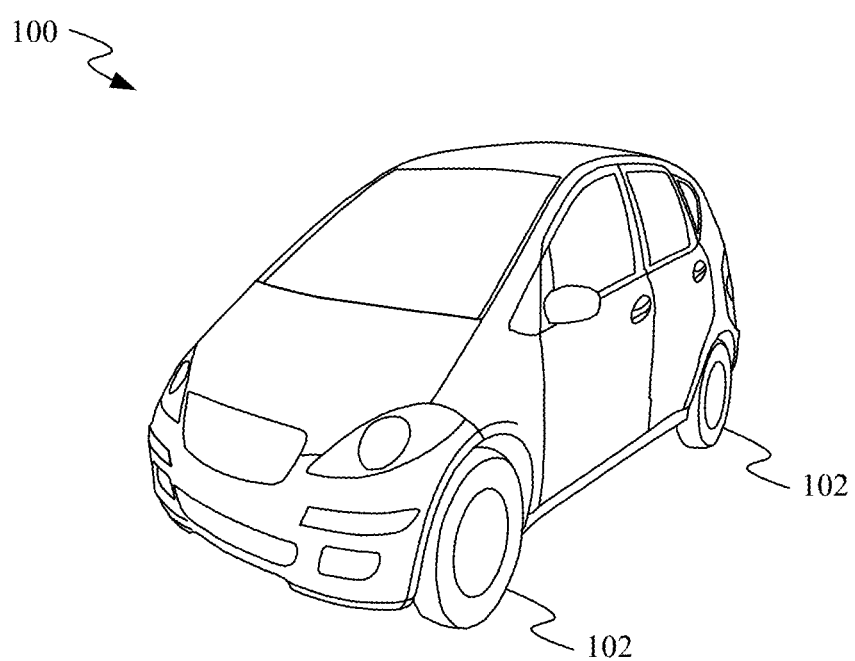
FIG. 1A shows an exemplary vehicle suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The feedback provided by any given control system can vary widely. The type and quality of control provided can be especially important in a control system that measures an amount of input as opposed to more binary inputs along the lines of on and off states. For example, levers, pedals and sliding switches are typically configured to provide varying levels of input. While a variable input control it can be helpful for a range in which the control system is typically used to be large enough to allow a user fine control over that typically used range. A control system taking the form of a lever, a pedal or a sliding switch is often mapped linearly. The linear mapping provides each portion of the control range substantially the same amount of space to control operations of the control system. This can be advantageous when normal use of the control system includes cycling the control system across a range of inputs selectable by the control system. In this way, each range can be selected with about the same precision. However, when the control system is almost always used to select values within a narrow range of values, making a linear mapping between a control position of the input control and an amount of power output makes much less sense. In such a use case, the linear mapping tends to waste space available for making fine adjustments in the desired range. Unfortunately, different users of a particular control can be prone to use the control in different manners and it may not always be possible to choose a single range within which all users commonly make use of the control system.

One solution to the aforementioned problems is to create profiles for particular users of a control system and then to adjust a response of the control system to account for usage patterns. In some embodiments, these profiles can be referred to as pull files. The pull files are data repositories that store information about use of the control system and can be used to adjust a response of the control system. In some embodiments, prior to a user operating the control system an average control input made by the user can be calculated using the numbers recorded in the pull file. When the user operates the control system, a majority of the control range can be mapped to the portion of the control range that is most commonly used by that particular user. A user can be identified in any number of ways including, for example: (1) by manually providing identification information, (2) by an access device by which the user is authorized to operate the control system, which sends identifying information to the control system; or (3) in relation to an authenticated use session in which a user's login credentials are used to map that user's use of the control system to a pull file associated with that user.

In the foregoing disclosure a particular use case will be discussed in which the control system takes the form of an accelerator or brake pedal of an electric vehicle. It should be noted that the specific use case should not be considered as limiting and that the described embodiments can pertain equally well to any other type of variable input control system. In some embodiments, the electric vehicle can include a user identification system that identifies a user by detecting a key fob associated with that user and used for entry into and operation of the electric vehicle. Anytime the user identification system senses that particular key fob, inputs made into the accelerator or brake pedals can be recorded to a particular pull file. Alternatively, the electric vehicle could prompt a user for identifying information as part of a startup routine of the electric vehicle. Identification could be accomplished in any number of other ways including for example, by voice recognition, identification of a personal electronic device carried by the user, selection of an existing profile from a input control within the vehicle or identification of the user identity by any other sensor within the car.

Once the user is identified, a processing unit or controller of the vehicle can be configured to adjust performance of at least one control system within the car. In some embodiments, the adjusted control system can take the form of the accelerator pedal of the vehicle. When the accelerator pedal of the vehicle is not mechanically linked to a control mechanism that directly changes voltage going to the motor, the controller can adjust an amount of energy provided for any given amount of input made to the accelerator pedal. The adjustment to the controller can be designed to center the displacement or downward stroke of the accelerator at or near the most commonly used setting. For example, if a particular user spends a majority of the time operating the vehicle with the accelerator depressed about 70% of the way down, the controller can change the accelerator pedal response to provide 70% power when the accelerator is pressed halfway down. While this ramp can be shaped in any number of ways to achieve this objective of placing commonly used power settings in the middle of the pedal stroke, one particularly effective response shaping operation involves shaping the curve so that depression of the accelerator pedal quickly raises the power level until the power gets close to the average power output at which point depression of the accelerator results in relatively less change in power. In this way, the user can reach a desired power level quickly and then enjoy an increased amount of control within the desired power range.

In some embodiments, a user's control behavior can be clustered in multiple regions depending on other factors such as for example, geographical factors. For example, during a morning or evening commute a driver may have exercise a substantially different set of driving characteristics. Analysis of the drivers power input levels could be concentrated in at least two substantially different regions of the motors power range. In such a case, mappings between pedal positions and power levels can be geographically dependent. For example, when a navigation system and time is indicative of a commuting behavior one response profile can be established while at any other time another response profile can be utilized. In this way, the accelerator pedal can be configured to more accurately predict desired power levels and adjust the power response to optimize performance for expected user inputs.

Updates to the pull file can be made periodically. In some embodiments, the response profile can be updated every time the car is driven. In some embodiments, the response profile can be continuously updated. In still other embodiments, profile update rates and sampling periods can be changed or updated by the user.

These and other embodiments are discussed below with reference to FIGS. 1A-6; however, those skilled in the art will readily appreciate that the detailed description given herein with respect to these figures is for explanatory purposes only and should not be construed as limiting.

Figure 1B:
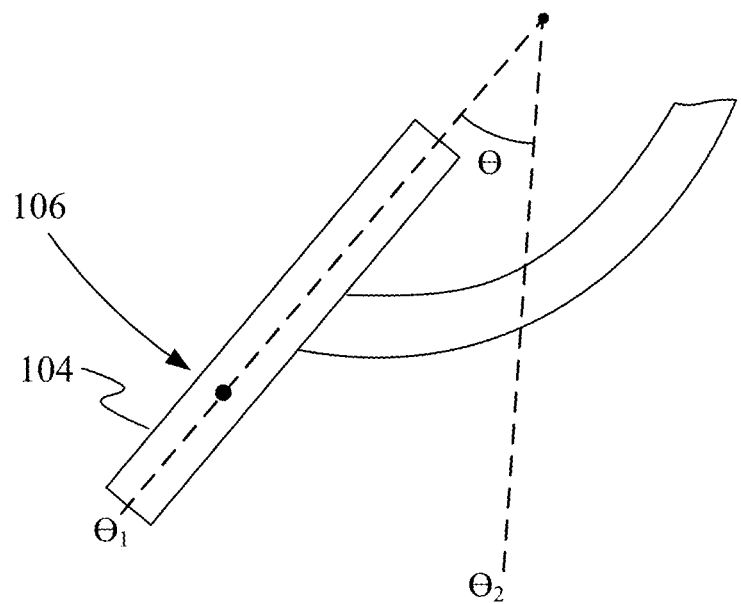
FIGS. 1B-1C show a range of motion of an exemplary user input device.
Figure 1C:
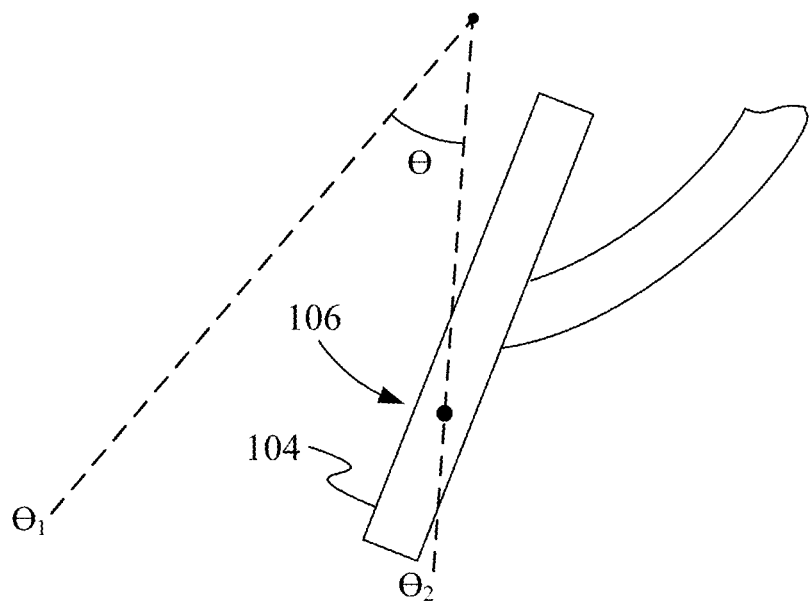

FIG. 1A shows an exemplary vehicle 100 suitable for use with the described embodiments. Vehicle 100 can be designed to carry one or more passengers and be manually controlled by a driver of vehicle 100. In some embodiments, vehicle 100 can be an electrically powered vehicle having an electric motor configured to drive wheels 102. The electric motor can be powered by a battery and take any number of forms including a brushed DC motor, a brushless DC motor and an induction motor. The driver can utilize pedals along the lines of an accelerator pedal 104, depicted in FIG. 1B to control the amount of power being delivered from the battery to the electric motor. The electric motor takes the power received from the battery to deliver torque to wheels 102. FIG. 1B shows accelerator pedal 104 of vehicle 100 in an undeflected position $\theta_1$ in which little or no power is transmitted from the battery to the electric motor, while FIG. 1C shows accelerator pedal 104 at position $\theta_2$ at which a maximum amount of energy would be transferred to the electric motor. FIGS. 1B-1C show a particular range of motion $\theta$ for accelerator pedal 104 although it should be appreciated that a stroke distance or displacement of accelerator pedal 104 can vary widely and the depicted range of motion should not be construed as limiting.

Figure 2:
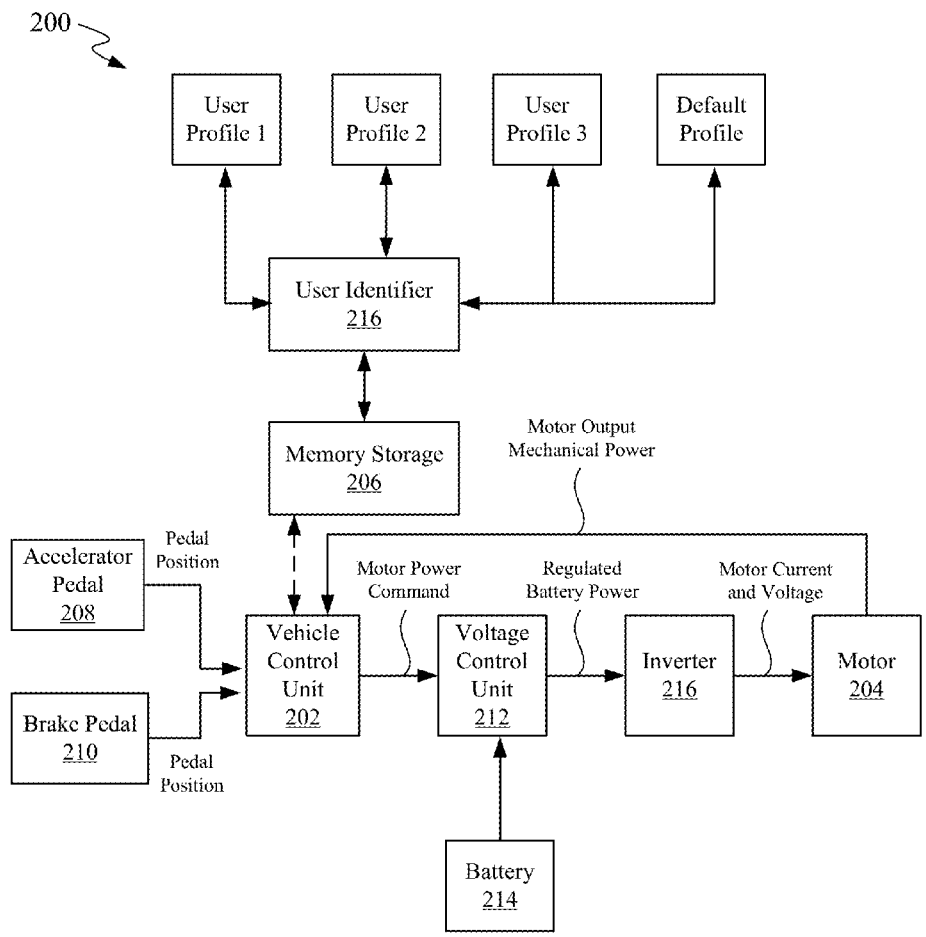
FIG. 2 shows a block diagram illustrating a control system.

FIG. 2 shows a block diagram illustrating a control system 200 for use with an electric vehicle. Control system 200 includes vehicle control unit 202. Vehicle control unit 202 is configured to receive a motor output mechanical power signal from motor 204 and user profile data from memory storage 206. The motor output mechanical power signal can allow for feedback control of motor 204. If a motor power command signal sent to voltage control unit 212 does not yield an expected amount of power from motor 204, the motor power commands sent by vehicle control unit 202 can be recalibrated so that the motor power command results in an expected amount of power being output. In some embodiments, the motor power commands can be continuously recalibrated so that an expected amounts of power at motor 204 is achieved. The user profile data stored within memory storage 206 can be used to adjust the motor power command transmitted for a given variable input control position. The variable input control position can take the form of accelerator pedal 208 and/or brake pedal 210. In some embodiments, adjustments to the motor power commands can be configured to place commonly used power commands in a central range of the variable input control. Voltage control unit 212 in turn takes the motor power command and correlates it with an amount of electrical energy to be delivered from battery 214 to inverter 216. The electrical energy is then transferred to inverter 216 as regulated battery power. It should be noted that in some embodiments, inverter 216 may not be needed in the event the vehicle associated with control system 200 is using a DC motor, in which case voltage control unit 212 could provide regulated battery power directly to motor 204. When inverter 216 is being utilized it converts the DC power supplied by voltage control unit 212 and converts it to AC power suitable for driving motor 204. Motor 204 then uses electricity supplied at a usable current and voltage to produce mechanical power that propels the car forward.

User identifier 218 can be associated with memory storage 206 and be configured to determine which user profile to select. In some embodiment, user identifier 218 can include a wireless receiver for reading an identification device carried by a user. The identification device can take many forms but some examples include a key fob for accessing the device or a personal electronic communication device configured to pair with and provide identification information to the vehicle. When user identifier correlates the user to an existing user profile, the existing user profile is used to optimize accelerator pedal inputs for selection of frequently used power levels. When user identifier 218 determines the user is using the vehicle for the first time, a new user profile is generated using a default profile. In this way, the user can be clearly identified and a corresponding user profile can be selected.

Figure 3A:
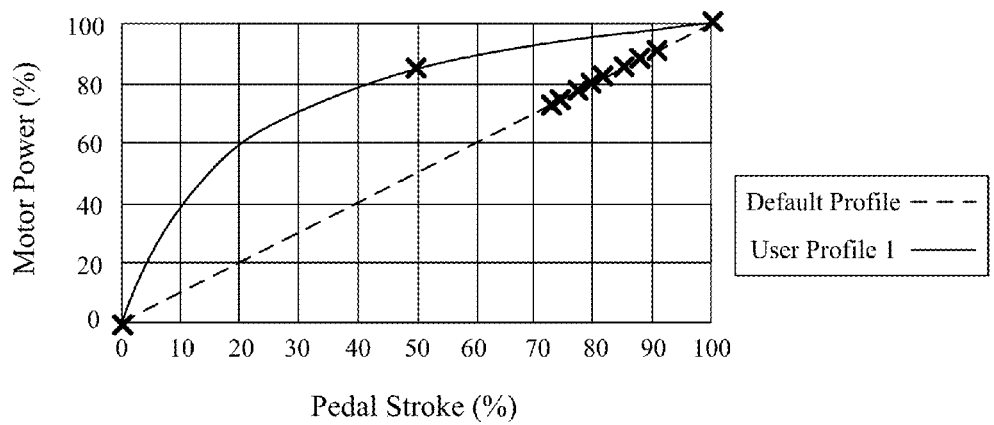
FIGS. 3A-3B show graphical representations depicting how power levels associated with various pedal positions can be adjusted.
Figure 3B:
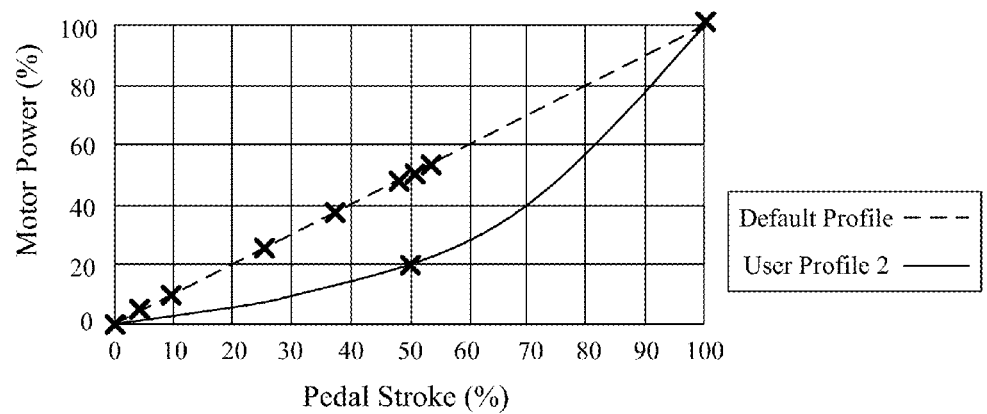

FIGS. 3A-3B show graphical representations depicting how power levels associated with various pedal positions can be adjusted. The dashed line in both FIGS. 3A and 3B represents a default profile. FIG. 3A shows how over a certain amount of time a driver associated with User Profile 1 tended to make inputs averaging about 85%. By adjusting an output of the vehicle control unit so that more power is supplied earlier in the pedal stroke a driver of a vehicle can more easily achieve a desired amount of power, as shown by the solid line representing user profile 1. Furthermore, by establishing a rapidly rising slope the desired power level approaches substantially faster than would be achieved if there was a simply linear slope to the curve. Because the driver spends substantially less time using lower levels of power, the ability to be able to make fine adjustments at lower levels of power becomes a lower priority for users that regularly operate the accelerator pedal at higher power levels. Also, by shaping the curve in this manner portions of the pedal stroke surrounding the average power level have a greater amount of fine adjustments space. Furthermore, as power gets increasingly higher, tuneability and controllability of the power level gets increasingly better. FIG. 3B shows how another driver associated with user profile 2 tended to make lower power inputs averaging about 20%. A more steadily increasing curve can be developed to accommodate the type of input range associated with user profile 2. In this way, the driver benefits from greater control of power input within the range in which most driving is performed. While power increases rapidly in the second half of the curve, a driver who rarely uses these power ranges would be less concerned in such a situation. It should be noted that a vehicle could also include a switch for alternating between a default power profile and a custom profile when desired. It should also be noted that the curves depicted show the average power value being placed precisely at the 50% mark, or a central point in the accelerator pedal range. Alternatively, the average power request could be offset from the central point when that offset helps to group more commonly used power settings within a central range of the accelerator pedal. In some embodiments, a central range of the accelerator pedal can correspond to control positions located within a central third of the possible range of control inputs, i.e. control positions between 33-66% of the control range, although other categorizations are certainly possible.

Figure 4A:
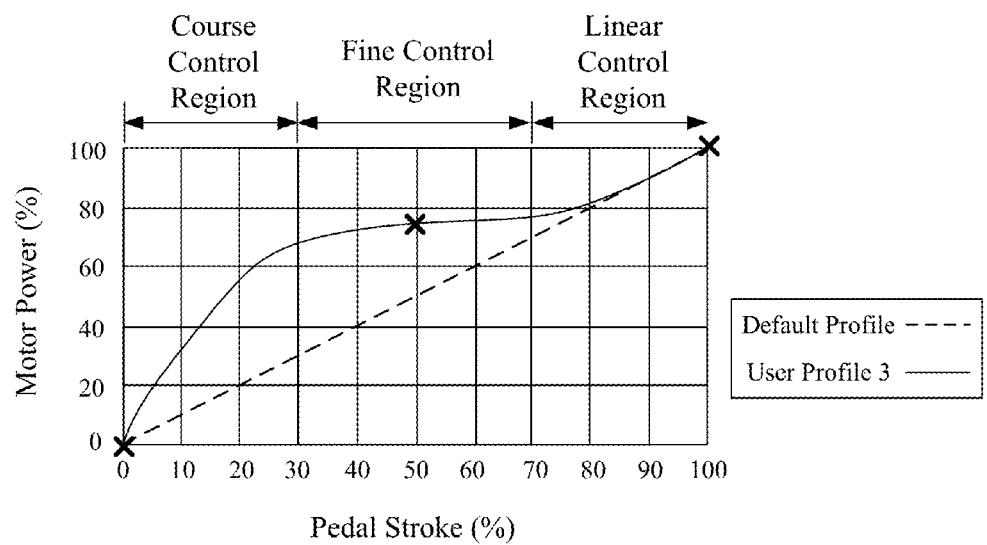
FIGS. 4A-4C show alternative configurations in which different curve shapes are applied to for a given set of user inputs.
Figure 4B:
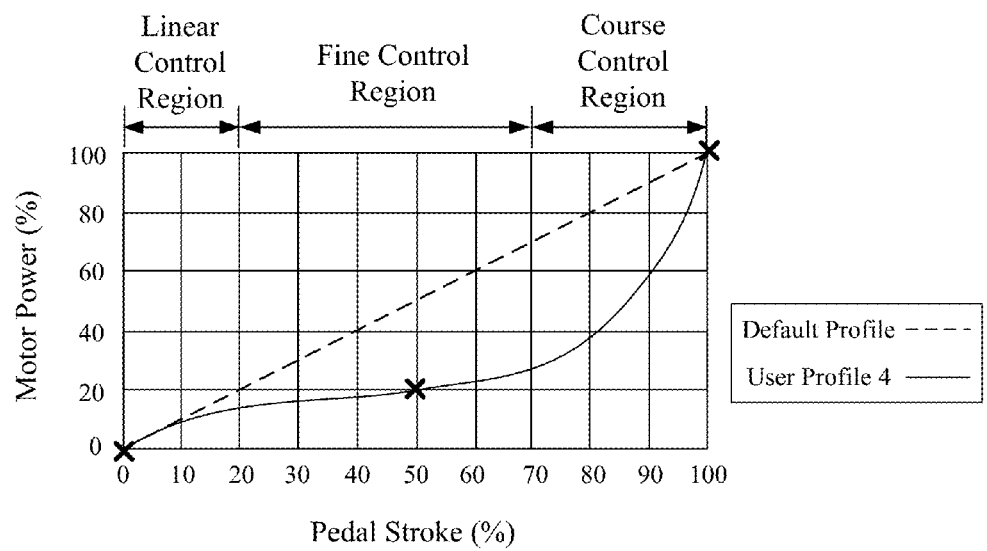
Figure 4C:
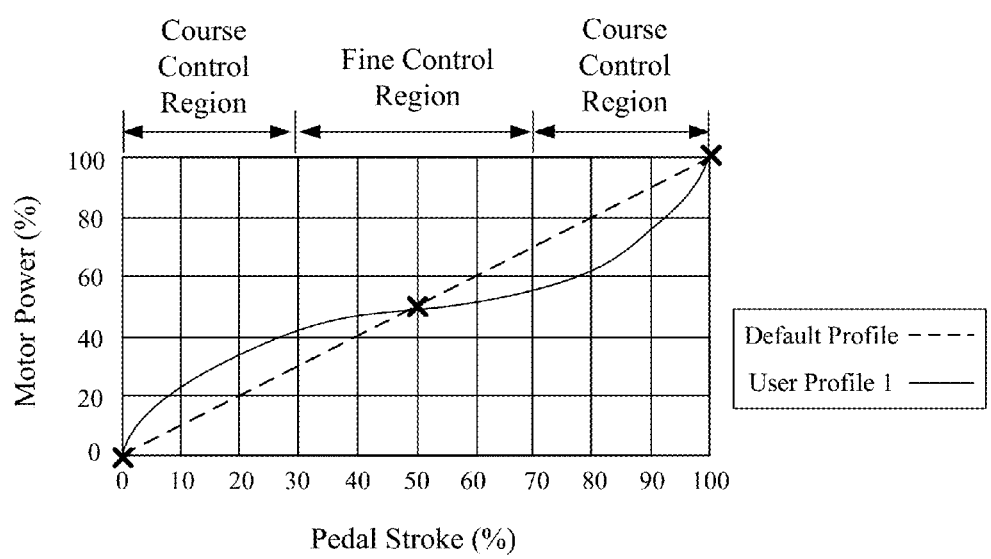

FIGS. 4A-4C show an alternative configuration in which different curve shapes are applied to for a given set of user inputs. FIG. 4A shows how a more aggressive driving profile represented by User Profile 3 can be shaped to have a course control region as a variable input control is first depressed transitioning to a fine control region and finally a more linear control region. This type of profile can be advantageous when a user's inputs are tightly spaced around a particular power level. For example, a vehicle used for long freeway transits could commonly be using a consistent amount of motor power. The slope of the curve in the fine control region could be adjusted or a width of the fine control region could be widened or narrowed to encompass a certain percentage of common control inputs. For example, the fine control region could be configured to encompass 70-80% of all inputs recorded to user profile 3. Similarly, FIG. 4B and User Profile 4 show a similarly shaped curve that starts in a linear control region transitions to a fine control region and then finishes with a course control region. Such a curve brings the user quickly to an average power level at which point the input control provides plenty of variability for getting precisely the desired amount of power. Finally FIG. 4C shows an additional embodiment in which the average power input is around 50%. While the linear mapping between power and pedal position does keep the average power input at around 50%, in some embodiments it can be helpful to adjust the high and low ends of the power curve to help get the user quickly to the desired level of power quickly and course control regions given that they are much less frequently employed.

Figure 5A:
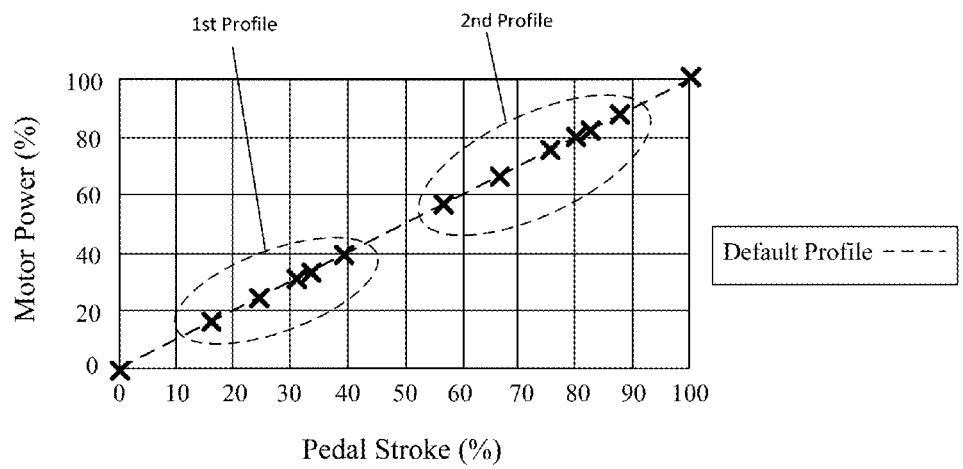
FIGS. 5A-5B show another graph showing a control configuration in which a single user can have multiple distinctly different power input profiles.
Figure 5B:
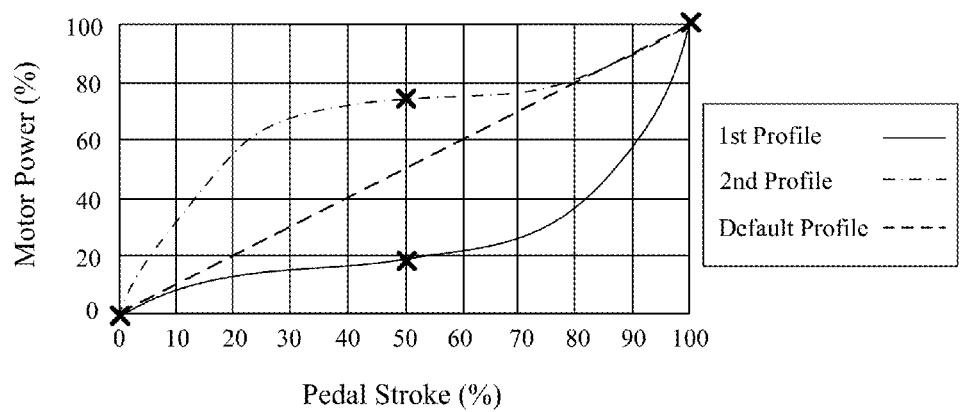

FIGS. 5A-5B show another graph showing a control configuration in which a single user can have multiple distinctly different power input profiles. For example, the depicted 1st profile can be tied to a particular geographic location or route of travel. For example, the 1st profile can be associated with only those times when the driver is commuting to work on a busy highway at a particular time of day. By grouping user inputs isolated to particular times and/or locations the profile can be idealized even better. Similarly, the depicted 2nd profile could be associated with locations or routes along which high amounts of acceleration and/or power are desired. For example, accelerating rapidly when turning onto a busy street, merging onto a freeway onramp, etc. Vehicles that include an inertial or satellite assisted navigation system can benefit most greatly from a system consistent with the one described since locations and times can be saved along with the user inputs. Although not depicted a third profile could be employed when driving outside areas or circumstances recognized by a processing unit of the control system.

Figure 6:
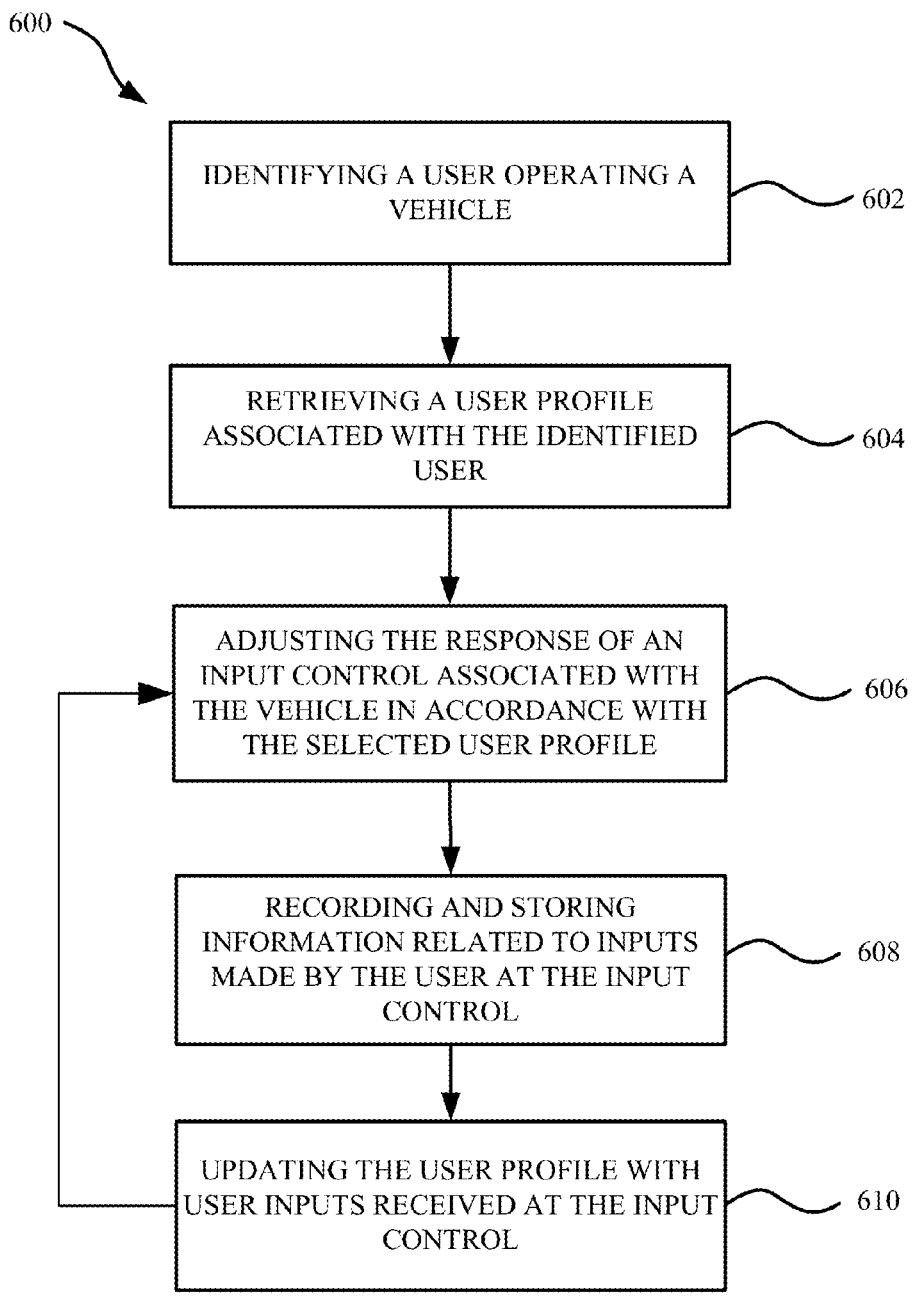
FIG. 6 shows a flow chart describing a method employed by a vehicle control system for varying an amount of power delivered in response to an input control.

FIG. 6 shows a flow chart describing a method 600 employed by a vehicle control system for varying an amount of power delivered in response to an input control. At a first block 602, a user operating a vehicle is identified. The identification can be performed with a sensor located within the vehicle and in communication with the vehicle control system. In some embodiments, the sensor can be configured to detect a personal device associated with the user along the lines of a key fob, a portable electronic device (e.g. identification of Bluetooth® device), an RFID tag and the like. In some embodiments, the sensor can be a biometric sensor configured to confirm an identity of the user based on voice recognition, a fingerprint or any other identifiable biometric signature. At block 604, once the user of the vehicle is identified, a user profile associated with that user can be retrieved from a memory storage device of the vehicle control system. The user profile can include a response curve that maps input control position to power output. The response curve can be generated based upon previous inputs to the input control made by the user. In particular, the stored data corresponds to an amount of power requested by the user through the input control. The response curve will generally be configured to place a majority of previous power requests within a central range of inputs selectable by the input control when practicable.

At block 606, the response curve associated with the retrieved user profile is used to change the response of the input control by mapping power values defined by the response curve to input control positions of the input control. At block 608, inputs made at the input control are stored to the retrieved user profile on the memory storage device. At block 610, the inputs recorded to the memory storage device are utilized to update the user profile. The process returns periodically to block 606 to remap the updated user profile with the user control. The frequency at which the user profile gets updated can vary widely. For example, the updating can be performed at a predefined interval or alternatively after the user profile has deviated from the loaded profile by a predefined amount. Deviation of 5-10% could cue a remapping of the input control with the user profile. In some embodiments, any updates to the mapping can be performed while the user is not actively engaged in driving the vehicle. For example, the remapping could be delayed until the vehicle is at a complete stop or until the vehicle is restarted. Alternatively the vehicle could be configured to notify the driver of the vehicle or even request a remapping be performed so the driver is not surprised by the change in the input control behavior while operating the vehicle. Furthermore, when the response of the input control is adjusted during vehicle operation, a processor associated with the vehicle control unit can be configured to gradually adjust the power/control position correlation for the variable input control over a period of time. In this way, the driver can be prevented from experiencing abrupt changes in the control output.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:
1. An electric vehicle, comprising:
a battery;
an electric motor;
a vehicle control unit configured to control a flow of power from the battery to the electric motor;
a variable input control in electrical communication with the vehicle control unit and configured to receive user inputs that transition the variable input control between multiple control positions, each one of the control positions corresponding to a different amount of power being supplied to the electric motor by the battery; and a memory storage device configured to record the amount of power supplied to the electric motor; and wherein the vehicle control unit periodically sends signals to adjust the amount of power delivered from the battery to the electric motor for one or more of the control positions so that a control position located within a central range of the variable input control corresponds to an average amount of power recorded by the memory storage device.

2. The electric vehicle as recited in claim 1, wherein the variable input control comprises an accelerator pedal.

3. The electric vehicle as recited in claim 2, wherein the vehicle control unit adjusts the amount of power associated with multiple control positions so that moving the accelerator pedal within a low range of the accelerator pedal changes the amount of power supplied to the electric motor by the battery substantially more than moving the accelerator pedal the same amount within the central range.

4. The electric vehicle as recited in claim 2, wherein the vehicle control unit adjusts the amount of power so that the average amount of power recorded by the memory storage device corresponds to the center of the central range of the accelerator pedal.

5. The electric vehicle as recited in claim 3, further comprising a user identification system configured to determine an identity of a user of the electric vehicle, wherein each of the recorded user inputs is stored in a user profile on the memory storage device associated with the user that made the user input.

6. The electric vehicle as recited in claim 5, further comprising a navigation system, wherein location information provided by the navigation system is recorded to the memory storage device and associated with a corresponding amount of power supplied to the electric motor at the location.

7. The electric vehicle as recited in claim 6, further comprising a timing system, wherein the information recorded on the memory storage device also includes timing information provided by the timing system.

8. The electric vehicle as recited in claim 6, wherein when the amounts of power recorded are substantially different for a particular location or route than other amounts of power recorded outside that particular location or route, the processor generates a separate user profile for the user to record user inputs received at that location or along that route, the separate user profile being engaged only when the navigation system identifies the electric vehicle is being operated along the particular location or route.

9. The electric vehicle as recited in claim 5, wherein the vehicle control unit alters a correlation between an amount of power output by the electric motor and control positions of the variable input control when the electric vehicle is operated along the particular location or route.

10. A method for adjusting a response provided by a variable input control configured to govern an amount of power supplied to a vehicle motor of a vehicle, the method comprising:

receiving a user input at the variable input control;

recording the amount of power supplied to the vehicle motor in response to the user input to a memory storage device; and adjusting the amount of power supplied for a given user input at the variable input control in accordance with the recorded amount of power and previous amounts of power recorded by the memory storage device so that an average amount of power supplied to the vehicle motor is biased towards a central range of the variable input control.

11. The method as recited in claim 10, further comprising: identifying a user operating the vehicle, wherein recording the user input to a memory storage device comprises recording the user input to a user profile associated with the identified user.

12. The method as recited in claim 11, wherein identifying the user operating the vehicle comprises identifying an electronic device being carried by the user that is associated with the user.

13. The method as recited in claim 12, wherein the electronic device comprises a key fob.

14. The method as recited in claim 10, further comprising readjusting the amount of power supplied for a given user input while a user is operating the vehicle.

15. The method as recited in claim 14, wherein the readjusting is performed in response to an average amount of power requested by the user changing by an amount that exceeds a predetermined threshold.

16. A control system suitable for controlling power delivered from a battery to a motor of a vehicle, the control system comprising:

a user input control configured to send a first signal when a user moves the user input control to a first control position and a second signal when the user moves the user input control to a second control position;

a memory storage device configured to record an amount of power delivered to the motor during operation of the vehicle; and a vehicle control unit configured to receive the signals from the user input control and transmit a power signal that adjusts a flow of power from a battery of the vehicle to the motor, wherein the vehicle control unit adjusts the amount of power supplied in response to the first signal by a first amount and the amount of power supplied in response to the second signal by a second amount different than the first amount, the adjustments being made in accordance with the recorded amount of power delivered to the motor over a period of time.

17. The control system as recited in claim 16, further comprising a user identification module configured to determine an identity of the user of the vehicle.

18. The control system as recited in claim 17, wherein the memory storage device records the amount of power requested and the identity of the user.

19. The control system as recited in claim 18, wherein the user input control comprises an accelerator pedal.

20. The control system as recited in claim 19, wherein a correlation between the amount of power supplied and motion of the user input control takes the form of a power curve and wherein the power curve has a substantially greater slope in a low range of the power curve than in the central range of the power curve when the average amount of power recorded by the memory storage device is greater than half the available power from the motor.

* * * * *